United States Patent
Friend et al.

(10) Patent No.: US 10,567,746 B2
(45) Date of Patent: *Feb. 18, 2020

(54) CALIBRATION JIG

(71) Applicant: Caterpillar Inc., Peoria, IL (US)

(72) Inventors: Paul Russell Friend, Morton, IL (US); David Paul Gitz, Peoria, IL (US); Maikel Orlando Torres Pineiro, Peoria, IL (US); Matthew Daniel Fike, Elmwood, IL (US); Qi Chen, Canton, MI (US); Jeffrey Walter Earleson, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/812,372

(22) Filed: Nov. 14, 2017

(65) Prior Publication Data

US 2019/0149814 A1 May 16, 2019

(51) Int. Cl.
*H04N 17/00* (2006.01)
*H04N 5/232* (2006.01)
*B60R 1/06* (2006.01)

(52) U.S. Cl.
CPC ....... *H04N 17/002* (2013.01); *H04N 5/23296* (2013.01); *B60R 1/06* (2013.01); *B60R 2300/402* (2013.01)

(58) Field of Classification Search
CPC .... H04N 17/002; H04N 5/23296; B60R 1/06; B60R 2300/402

USPC ........................................................ 348/187

See application file for complete search history.

(56) References Cited

U.S. PATENT DOCUMENTS

| 4,907,169 | A | 3/1990 | Lovoi |
| 6,067,165 | A | 5/2000 | Matsumiya et al. |
| 6,236,896 | B1 | 5/2001 | Watanabe et al. |
| 6,445,201 | B1 | 9/2002 | Simizu et al. |
| 7,089,776 | B2 | 8/2006 | Dale, Jr. |
| 7,424,387 | B1 | 9/2008 | Gill et al. |
| 9,508,146 | B2 * | 11/2016 | Davies ................ G06T 3/60 |
| 2014/0232871 | A1 * | 8/2014 | Kriel .................. H04N 5/2259 348/148 |
| 2016/0142620 | A1 * | 5/2016 | Sawa ................. H04N 5/23293 348/143 |

* cited by examiner

*Primary Examiner* — Jefferey F Harold
*Assistant Examiner* — Omer Khalid
(74) *Attorney, Agent, or Firm* — Harrity & Harrity LLP

(57) ABSTRACT

A calibration jig for calibrating an image capturing device mounted on a machine is provided. A second rope is connected to a first rope at a first connection point. A third rope is connected to the first rope and the second rope at a second connection point and a third connection point respectively. The first, second, and third ropes, when taut, define the calibration triangle with the first, second, and the third connection points as vertices of the calibration triangle. A center rope is connected to the first connection point with a first anchor point associated with the machine. A first tether rope is connected to the second connection point of the calibration triangle with a second anchor point associated with the machine. A second tether rope is connected to the third connection point of the calibration triangle with a third anchor point associated with the machine.

20 Claims, 5 Drawing Sheets

CALIBRATION JIG

TECHNICAL FIELD

The present disclosure relates to a calibration jig for an image capturing device, and more specifically, to the calibration jig for the image capturing device mounted on a machine.

BACKGROUND

One or more cameras are typically provided on a machine to capture an image feed of an area surrounding the machine. The cameras can provide many assistance functions to a driver such as lane keeping, parking aid, detection of obstacles and other objects, vehicle detection, and collision avoidance. Augmented reality may be used to overlay assistance information on the image feed that the driver of the machine is looking at. In order to properly overlay the information, a position and an orientation of the camera must be determined. Determining the position and the orientation is referred to as extrinsic calibration of the camera.

For some applications, an absolute position and orientation of the camera may be required to be referenced to Global Navigation Satellite System (GNSS) coordinates. For other applications, a relative position and orientation of the camera may be required only to be referenced to the ground. It may be difficult to obtain a high accuracy camera calibration for automotive or heavy-duty machines. Further, if the position and the orientation of the camera are not determined with a high enough accuracy, the information overlaid on the image feed may not correlate with reality. Sometimes, the information may be at an offset with the image feed and may seem to be floating around in space. Accordingly, there may be an increased challenge when performing installations, maintenance, or adjustments in the field.

Known solutions include providing large checkered tarps or surveying stakes at a predefined location for calibrating the camera. However, adjusting and calibrating the camera using such a set-up is tedious, time consuming, and may even be labor intensive. Further, the checkered tarps and/or surveying stakes may be difficult to deploy and store.

U.S. Pat. No. 7,089,776 describes a jig for use in certifying accuracy of a vehicle wheel aligner. The jig includes two axles of equal length having stub shafts at the ends of the axles and two adjustable side spacers for releasable connection to the stub shafts. Plates for mounting heads of the aligner system also are attached to the stub shafts. Stands support the corners of the rectangular jig formed by the connected axles and spacers. The aligner system measures parameters of the jig from the attached heads. A diagonal spacer of a predetermined length, may be used in setting the diagonals of the rectangular jig during assembly to be equal. In the example disclosed, the apparatus also includes a distance setting shaft for use in setting lengths of each of the two side spacers to be equal.

SUMMARY OF THE DISCLOSURE

In one aspect of the present disclosure, a calibration jig for calibrating an image capturing device mounted on a machine is provided. The calibration jig includes a calibration triangle having a first rope, a second rope, a third, and a center rope. The second rope is connected to the first rope at a first connection point. The first rope and the second rope are equal in length. The third rope is connected to the first rope and the second rope at a second connection point and a third connection point respectively. The first rope, the second rope, and the third rope, when taut, define the calibration triangle with the first connection point, the second connection point, and the third connection point as vertices of the calibration triangle. The center rope is configured to connect the first connection point with a first anchor point associated with the machine. A first tether rope is configured to connect the second connection point of the calibration triangle with a second anchor point associated with the machine. A second tether rope is configured to connect the third connection point of the calibration triangle with a third anchor point associated with the machine. The first tether rope and the second tether rope are equal in length.

In another aspect of the present disclosure, a method of arranging a calibration jig including a calibration triangle, a center rope, a first tether rope, and a second tether rope is provided. The calibration jig is used for calibration of an image capturing device mounted on a machine. The method includes placing the calibration triangle on a ground plane in a field of view of the image capturing device. The calibration triangle includes a first rope, a second rope, a third rope, and a center rope. The second rope is connected to the first rope at a first connection point. The first rope and the second rope are equal in length. The third rope is connected to the first rope and the second rope at a second connection point and a third connection point respectively. The first rope, the second rope, and the third rope, when taut, define the calibration triangle with the first connection point, the second connection point, and the third connection point as vertices of the calibration triangle. The method includes connecting the first connection point with a first anchor point associated with the machine using the center rope. The method includes connecting the second connection point of the calibration triangle with a second anchor point associated with the machine using the first tether rope. The method includes connecting the third connection point of the calibration triangle with a third anchor point associated with the machine using the second tether rope. The first tether rope and the second tether rope are equal in length. The method includes the first connection point outward of the calibration triangle. The method includes adjusting the center rope to align the calibration jig for calibration of the image capturing device.

In yet another aspect of the present disclosure, a calibration system is provided. The system includes a machine, an image capturing device mounted on the machine, and a calibration jig for calibrating the image capturing device. The image capturing device is configured to capture an image of an environment of the machine. The calibration jig includes a calibration triangle including a first rope, a second rope, a third rope, and a center rope. The second rope is connected to the first rope at a first connection point. The first rope and the second rope are equal in length. The third rope is connected to the first rope and the second rope at a second connection point and a third connection point respectively. The first rope, the second rope, and the third rope, when taut, define the calibration triangle with the first connection point, the second connection point, and the third connection point as vertices of the calibration triangle. The center rope is configured to connect the first connection point with a first anchor point associated with the machine. A first tether rope is configured to connect the second connection point of the calibration triangle with a second anchor point associated with the machine. A second tether rope is configured to connect the third connection point of the calibration triangle with a third anchor point associated with the machine, wherein the first tether rope and the second tether rope are equal in length.

Other features and aspects of this disclosure will be apparent from the following description and the accompanying drawings.

DETAILED DESCRIPTION

Figure 1:
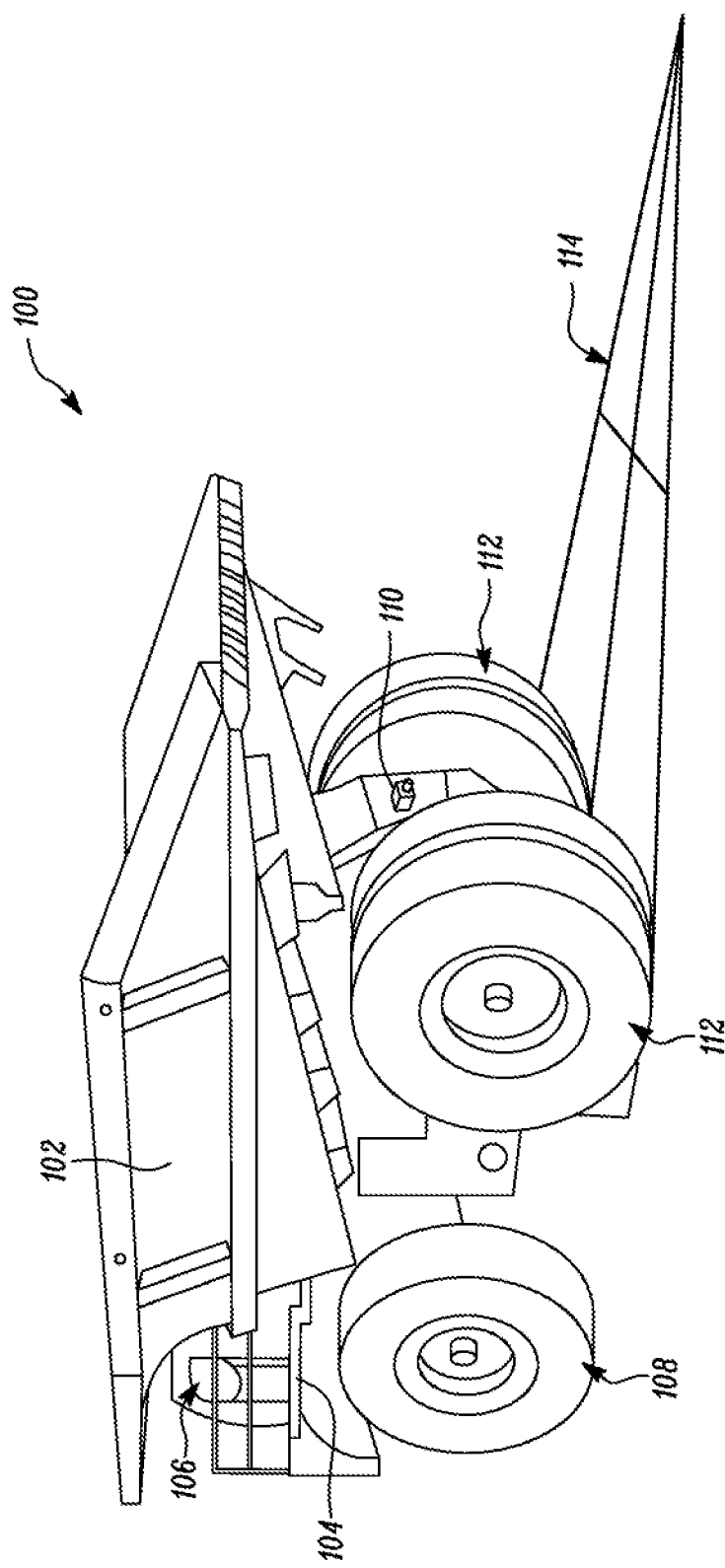
FIG. 1 is a perspective view of an exemplary machine and a calibration jig, in accordance with the concepts of the present disclosure.

Referring to FIG. 1, an exemplary machine 100 is illustrated. The machine 100 is embodied as a dump truck. The machine 100 includes a truck body 102 pivotably attached to a frame 104 of the machine 100. Although the machine 100 is illustrated as an off-highway truck, those skilled in the art will appreciate that the machine 100 may be any other known machine having an image capturing device mounted thereon.

The machine 100 has an operator cabin 106 housing controls to operate the machine 100. Ground engaging elements or front and rear wheels 108, 112 are provided on the machine 100 for mobility. During operation, the truck body 102 pivots about a pair of pivot pins. The movement of truck body 102 is controlled by one or more actuators. The truck body 102 is configured to be loaded with material, and the machine 100 transports the material from one location to another for dumping. For example, the truck body 102 may be loaded with the material. After moving to the dumping location, the truck body 102 may be actuated for dumping the material.

An image capturing device 110 is mounted on the machine 100. The image capturing device 110 is configured to capture an image feed of an area surrounding the machine 100. The image capturing device 110 may include a camera, a camcorder, or any other known video or image capturing apparatus. In this case, the image capturing device 110 is mounted on a rear portion of the machine 100 and between the rear wheels 112 of the machine 100. Alternatively, additional image capturing devices may be provided at other locations on the machine 100 to provide a 360° view of the area surrounding the machine 100.

The present disclosure relates to a calibration jig 114 for the image capturing device 110 mounted on the machine 100. The calibration jig 114 is made up of ropes that are anchored to the machine 100 for calibration of the image capturing device 110. When taut, the calibration jig 114 forms a calibration triangle 201 with respect to the machine 100 and can be manually adjusted to appropriately calibrate the image capturing device 110, as will be explained in detail in connection with FIGS. 2 to 4.

Figure 2:
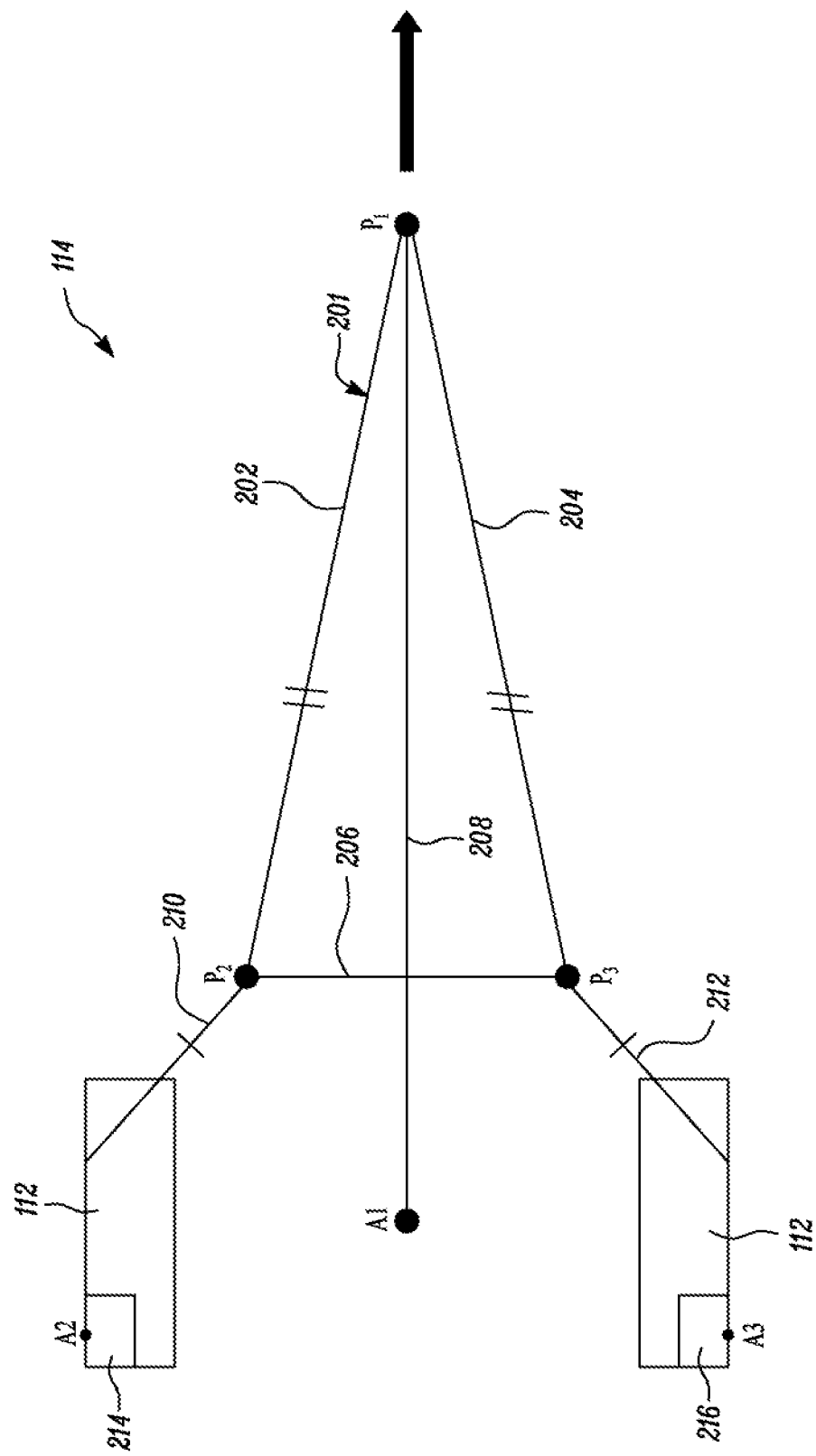
FIG. 2 is a schematic view of the calibration jig, in accordance with the concepts of the present disclosure.
Figure 3:
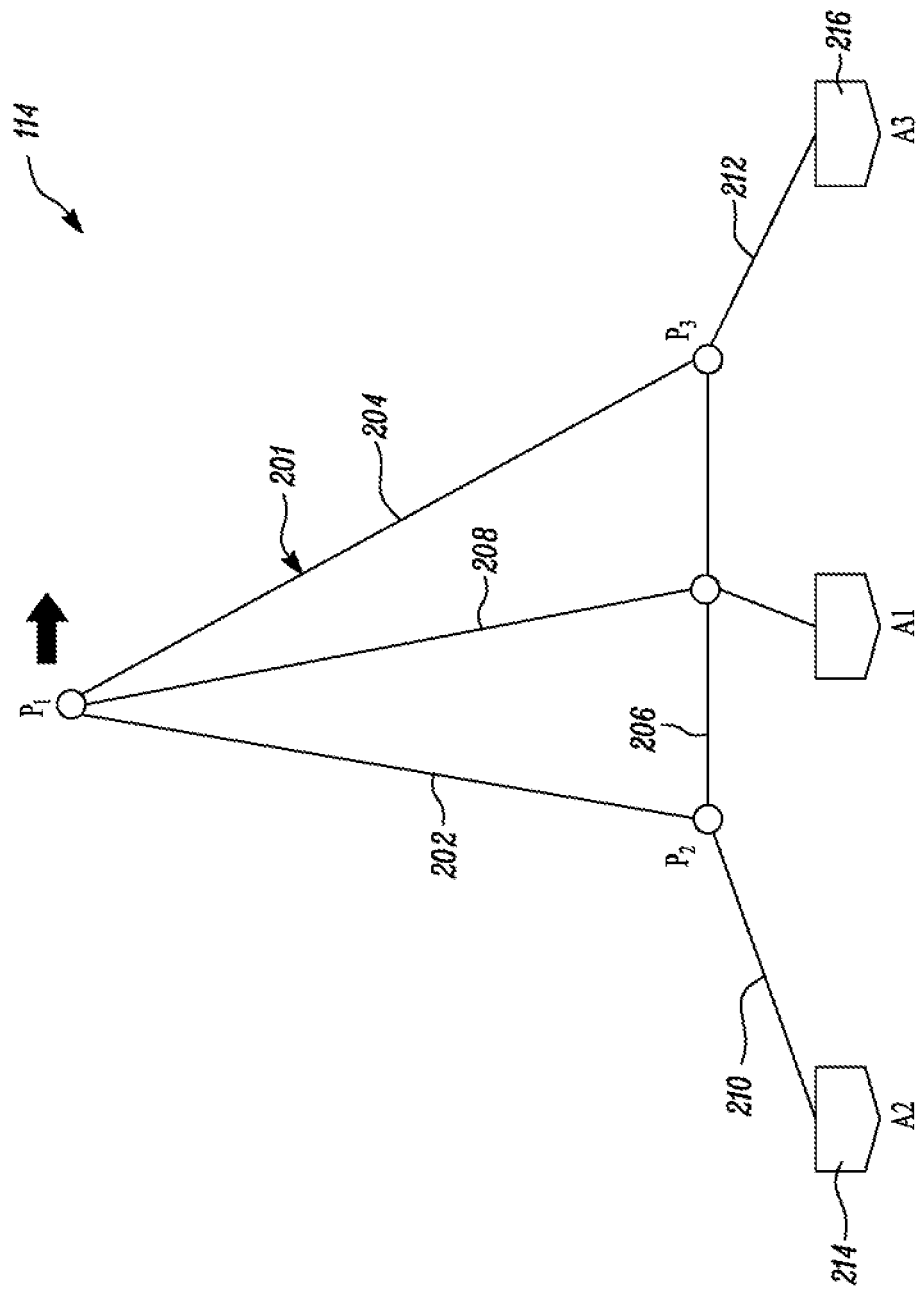
FIGS. 3 and 4 are schematic views depicting an adjustment of the calibration jig, in accordance with the concepts of the present disclosure.
Figure 4:
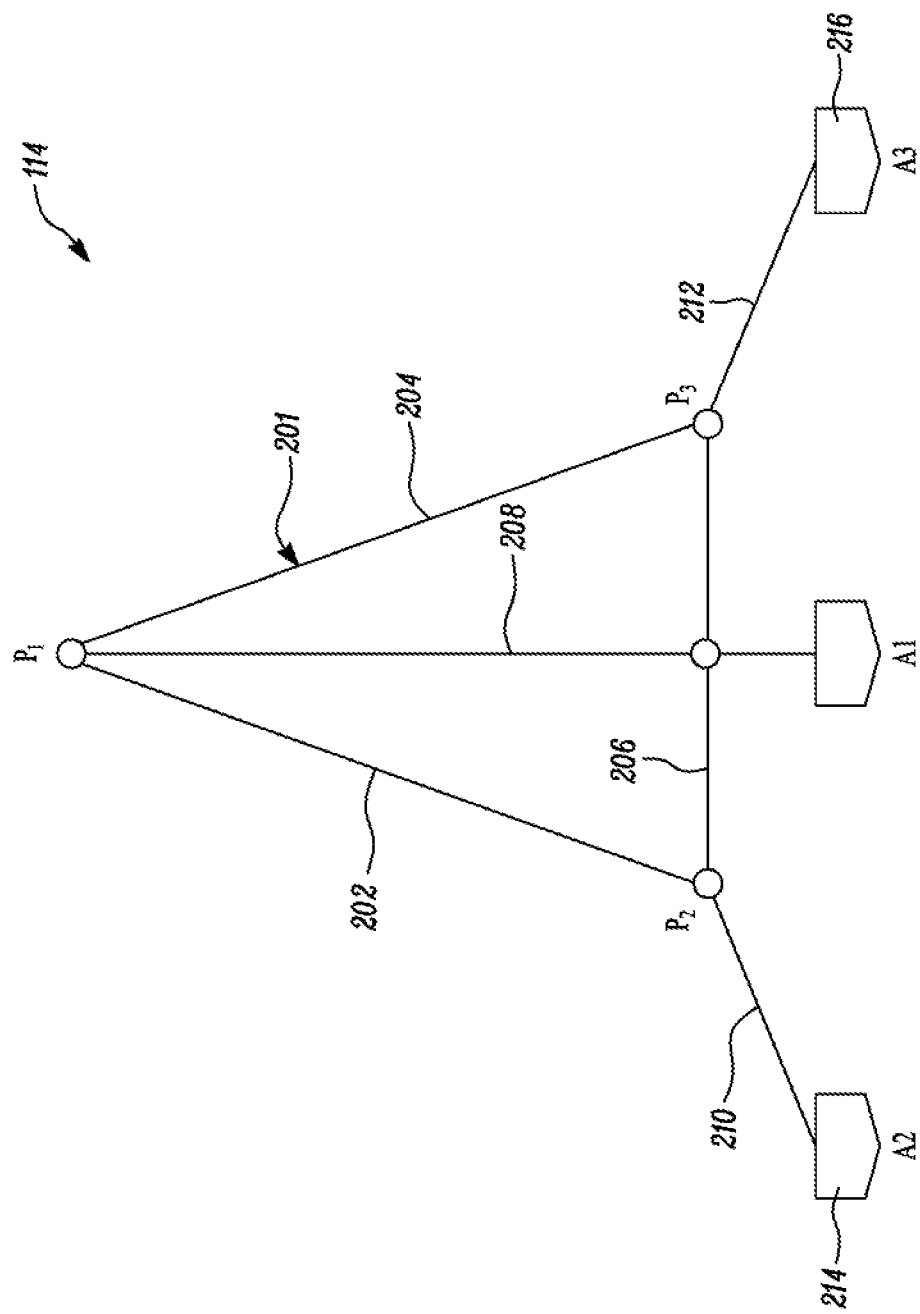

Referring to FIGS. 2 to 4, the calibration jig 114 includes a first rope 202, a second rope 204, a third rope 206, and a center rope 208. The first, second, and third ropes 202, 204, 206 of the calibration jig 114 are arranged to form the calibration triangle 201. More particularly, the first rope 202 is connected to the second rope 204 at a first connection point P1. During operation, the first connection point P1 may be pulled in an outward direction (see arrow in FIG. 2) away from the machine 100 for aligning the calibration triangle 201. The first and second ropes 202, 204 are of equal length.

Further, the third rope 206 is connected to the first rope 202 at a second connection point P2. Also, the third rope 206 is connected to the second rope 204 at a third connection point P3. When the first, second, and third ropes 202, 204, 206 are taut, the calibration triangle 201 is formed with the first, second and third connection points P1, P2, P3 as vertices of the calibration triangle 201. The first and second ropes 202, 204 are arranged such that an angle is formed between the first and second ropes 202, 204 at the first connection point P1, and angles are formed at the second and third connection points P2 and P3 between the first rope 202 and the third rope 206 and between the second rope 204 and the third rope 206 respectively.

Further, the calibration jig 114 is attached to the machine 100 at three locations. The center rope 208 is connected at one end to the first connection point P1 and is anchored to the machine 100 at a first anchor point A1 at another end thereof. In one example, the first anchor point A1 coincides with a central axis of the machine 100 and lies vertically below the image capturing device 110. In another example, the image capturing device 110 may be at an offset from a point vertically above the first anchor point A1. In some embodiments, the center rope 208 may be connected to a stake directly below a center of an axle of the wheels 108, 112 of the machine 100. Alternatively, the center rope 208 may be fixedly attached to any other structure that lies in a central portion of the machine 100.

The calibration triangle 201 may be manually moved and adjusted for calibrating the image capturing device 110 in two-dimensional space. Further, the calibration jig 114 can be easily attached to the machine 100. A first tether rope 210 connected to the second connection point P2 is used to attach the calibration jig 114 to a second anchor point A2 on the machine 100. That is, the first tether rope 210 connects the second connection point P2 of the calibration triangle 201 with the second anchor point A2 associated with the machine 100. Similarly, a second tether rope 212 connected to the third connection point P3 is used to attach the calibration jig 114 to a third anchor point P3 on the machine 100. That is, the second tether rope 212 connects the third connection point P3 of the calibration triangle 201 with the third anchor point A3 associated with the machine 100. The first and second tether ropes 210, 212 are of equal length. In one example, the second and third anchor points A2, A3 are respectively provided on a first wheel chock 214 and a second wheel chock 216 (see FIG. 2) that are pressed against the respective rear wheels 112 of the machine 100 present on either side of the center rope 208. Alternatively, the calibration jig 114 may be attached to any other structure on the machine 100 that is present on either side of the center rope 208.

In one embodiment, the third rope 206 may be made up of two equal-length segments that are joined to each other at a center of the third rope 206. In another embodiment, a ring (not shown) may be used for connecting the equal length segments of the third rope 206 with each other, such that the center rope 208 also passes through the ring. It should be noted that the ring is provided in such a manner that a movement of the center rope 208 of the calibration jig 114 is restricted in a direction parallel to the third rope 206. The ring allows movement of the center rope 208 with respect to the third rope 206 for aligning the calibration jig 114. In some cases, rings may also be used at the second and third connection points P2 and P3 to allow easy attachment of the respective ropes.

For performing the calibration operation, initially the calibration jig 114 is arranged on a ground plane in a field of view of the image capturing device 110. The calibration jig 114 is then attached to the machine 100 at the first, second and third anchor points A1, A2, A3. An operator or a ground personnel designated to perform calibration may pull the first connection point P1 outwardly of the calibration triangle 201 in the ground plane in a direction orthogonal to the third rope 206, aligning the calibration jig 114 for calibration of the image capturing device 110. The calibration triangle 201 is formed on the ground plane such that the center rope 208 runs from the peak of the calibration triangle 201 to the center of the machine 100. Further, a cross section of the calibration triangle 201 is sized such that the calibration triangle 201 is under tension.

Referring to FIGS. 3 and 4, an exemplary alignment process will be explained. After arranging the calibration jig 114 with respect to the machine 100, the ground personnel manually pulls the first connection point P1 outwards and in a direction away from the machine 100 for initial alignment of the calibration triangle 201. For further alignment, the center line of the calibration jig 114 should form a straight line between the first connection point P1 and the first anchor point A1. However, sometimes, as shown in FIG. 3, the first connection point P1 may be offset, for example, to left of the straight line. In other cases, the first connection point P1 may be offset to right of the straight line. In such cases, the calibration jig 114 needs to be manually adjusted and re-centered so that the first connection point P1, the first anchor point A1, and a connection point of the center rope 208 and the third rope 206 may be aligned in one straight line as shown in FIG. 4.

Accordingly, the first connection point P1 is held by the ground personnel and moved along the ground plane in a direction substantially parallel to that of the third rope 206. In the given example, the first connection point P1 is moved rightwards in the direction of the arrow for centering the calibration jig 114 such that the center rope 208 passes through a center of the calibration triangle 201 in which an angle formed between the center rope 208 and the first rope 202 is equal to an angle formed between the center rope 208 and the second rope 204. Alternatively, if the first connection point P1 was right of the straight line joining the first connection point P1 and the first anchor point A1, the ground personnel would need to move the first connection point P1 along the ground plane in a leftwards direction.

The arrangement of the calibration jig 114 in FIG. 4 shows the calibration triangle 201 in an aligned position. As the dimensions of the calibration triangle 201 and its distance from the machine 100 are known, the calibration jig 114 can be used for extrinsic calibration of the image capturing device 110. Once the image capturing device 110 is calibrated, the image capturing device 110 may be used for augmented reality applications.

The first, second, third ropes 202, 204, 206, the center rope 208, and the first and second tether ropes 210, 212 may be low stretch ropes, straps, or tapes. The calibration jig 114 is made of individual ropes that are connected to each other to form the calibration triangle 201. Same calibration jig 114 may be used to calibrate different image capturing devices 110 mounted on the machine 100 or different machines 100.

INDUSTRIAL APPLICABILITY

Figure 5:
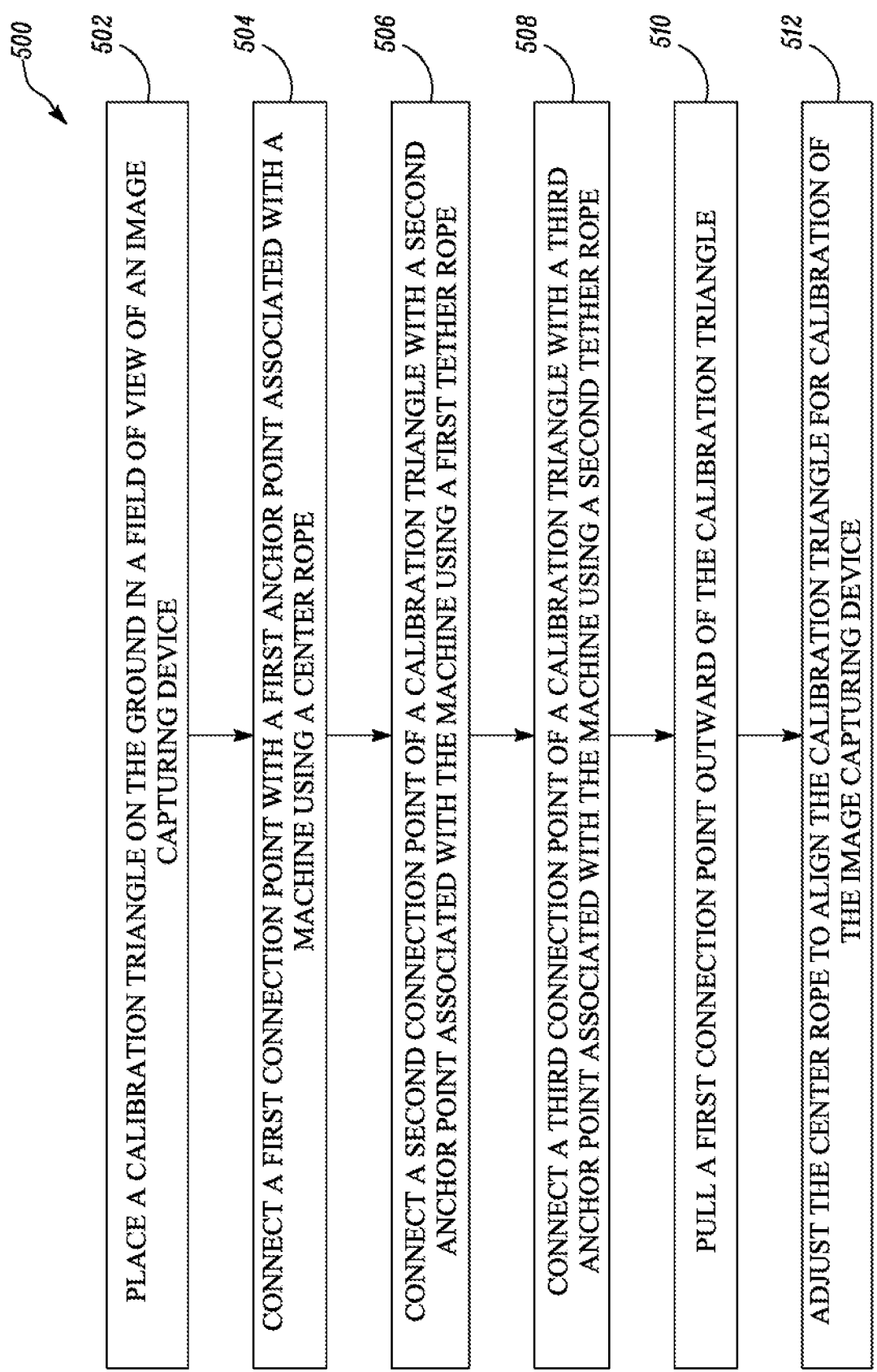
FIG. 5 is a flowchart of a method for using the calibration jig, in accordance with the concepts of the present disclosure.

The present disclosure relates to the calibration jig 114 for calibration of the image capturing device 110 mounted on the machine 100. Referring to FIG. 5, at step 502, the method 500 includes placing the calibration triangle 201 on the ground plane in the field of view of the image capturing device 110. At step 504, the method 500 includes connecting the first connection point P1 with the first anchor point A1 associated with the machine 100 using the center rope 208. At step 506, the method 500 includes connecting the second connection point P2 of the calibration triangle 201 with the second anchor point A2 associated with the machine 100 using the first tether rope 210. At step 508, the method 500 includes connecting the third connection point P3 of the calibration triangle 201 with the third anchor point A3 associated with the machine 100 using the second tether rope 212. The first tether rope 210 and the second tether rope 212 are equal in length. Once the calibration triangle 201 is arranged, the method 500 includes, at step 510, pulling the first connection point P1 outward of the calibration triangle 201. At step 512, the method 500 includes adjusting the center rope 208 to align the calibration triangle 201 for calibration of the image capturing device 110.

The self-aligning calibration jig 114 of the present disclosure is a cost-effective, simple, and accurate solution for relative calibration of the image capturing device 110 mounted on the machine 100. Also, the calibration jig 114 may be easily deployed at any location by a single ground personnel and allows for accurate calibration of the image capturing device 110 with respect to the calibration jig 114. The calibration process is quick and involves maneuvering of the calibration jig 114, without requiring movement of the machine 100. The calibration jig 114 may be used each time the image capturing device 110 needs to be calibrated. The calibration process is easy and after calibration, the calibration jig 114 may be disassembled and stored.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A calibration jig for calibrating an image capturing device mounted on a machine, the calibration jig comprising:
   a calibration triangle including:
      a first rope;
      a second rope connected to the first rope at a first connection point, wherein the first rope and the second rope are equal in length; and
      a third rope connected to the first rope and the second rope at a second connection point and a third connection point respectively, wherein the first rope, the second rope, and the third rope, when taut, define the calibration triangle with the first connection point, the second connection point, and the third connection point as vertices of the calibration triangle;
   a center rope configured to connect the first connection point with a first anchor point associated with the machine;
   a first tether rope configured to connect the second connection point of the calibration triangle with a second anchor point associated with the machine; and
   a second tether rope configured to connect the third connection point of the calibration triangle with a third anchor point associated, with the machine, wherein the first tether rope and the second tether rope are equal in length,
wherein the second anchor point and the third anchor point are provided on a first wheel chock and a second wheel chock respectively.

2. The calibration jig of claim 1, wherein the first anchor point is located vertically below the image capturing device.

3. The calibration jig of claim 1, wherein the first wheel chock and the second wheel chock are pressed against ground engaging elements of the machine.

4. The calibration jig of claim 1, wherein the first connection point is pulled outward of the calibration triangle in a ground plane in a direction orthogonal to the third rope to align the calibration jig for calibration of the image capturing device.

5. The calibration jig of claim 1, wherein the third rope comprises two segments of equal length joined together by a ring that allows the center rope to pass through it.

6. The calibration jig of claim 1, wherein the center rope is adjusted to pass through a center of the calibration triangle to align the calibration jig for calibration of the image capturing device.

7. The calibration jig of claim 6, wherein the center rope is adjusted by moving the first connection point in a ground plane in a direction substantially parallel to the third rope.

8. The calibration jig of claim 1, wherein the calibration jig is used for calibration of the image capturing device in augmented reality systems.

9. A method of arranging a calibration jig comprising a calibration triangle, a center rope, a first tether rope, and a second tether rope, wherein the calibration jig is used for calibration of an image capturing device mounted on a machine, the method comprising:
placing the calibration triangle on a ground plane in a field of view of the image capturing device, wherein the calibration triangle includes:
a first rope:
a second rope connected to the first rope at a first connection point, wherein the first rope and the second rope are equal in length; and
a third rope connected to the first rope and the second rope at a second connection point and a third connection point respectively,
wherein the first rope, the second rope, and the third rope, when taut, define the calibration triangle with the first connection point, the second connection point, and the third connection point as vertices of the calibration triangle, and
wherein the third rope comprises two segments of equal length joined together by a ring that allows the center rope to pass through the ring;
connecting the first connection point with a first anchor point associated with the machine using the center rope;
connecting the second connection point of the calibration triangle with a second anchor point associated with the machine using the first tether rope;
connecting the third connection point of the calibration triangle with a third anchor point associated with the machine using the second tether rope, wherein the first tether rope and the second tether rope are equal in length;
pulling the first connection point outward of the calibration triangle; and
adjusting the center rope to align the calibration triangle for calibration of the image capturing device.

10. The method of claim 9, wherein the first anchor point is located vertically below the image capturing device.

11. The method of claim 9, wherein the second anchor point and the third anchor point are provided on a first wheel chock and a second wheel chock respectively wherein the first wheel chock and the second wheel chock are pressed against ground engaging element of the machine.

12. The method of claim 9, wherein pulling the first connection point comprises pulling the first connection point outward of the calibration triangle in a ground plane in a direction orthogonal to the third rope to align the calibration jig for calibration of the image capturing device.

13. The method of claim 9, wherein adjusting the center rope comprises adjusting the center rope to pass through a center of the calibration triangle to align the calibration jig for calibration of the image capturing device.

14. The method of claim 13, wherein adjusting the center rope comprises adjusting the center rope by moving the first connection point in a ground plane in a direction substantially parallel to the third rope.

15. A calibration system comprising:
a machine;
an image capturing device mounted on the machine, the image capturing device configured to capture an image of an environment of the machine; and
a calibration jig for calibrating the image capturing device, the calibration jig comprising:
a calibration triangle including:
a first rope;
a second rope connected to the first rope at a first connection point, wherein the first rope and the second rope are equal in length; and
a third rope connected to the first rope and the second rope at a second connection point and a third connection point respectively,
wherein the first rope, the second rope, and the third rope, when taut, define the calibration triangle with the first connection point, the second connection point, and the third connection point as vertices of the calibration triangle, and
wherein the first connection point is pulled outward of the calibration triangle in a ground plane in a direction orthogonal to the third rope;
a center rope configured to connect the first connection point with a first anchor point associated, with the machine;
a first tether rope configured to connect the second connection point of the calibration triangle with a second anchor point associated with the machine; and
a second tether rope configured to connect the third connection point of the calibration triangle with a third anchor point associated with the machine, wherein the first tether rope and the second tether rope are equal in length.

16. The system of claim 15, further comprising a first wheel chock and a second wheel chock pressed against ground engaging elements of the machine, wherein the second anchor point and the third anchor point are provided on the first wheel chock and the second wheel chock respectively.

17. The system of claim 15, wherein the first connection point is pulled outward of the calibration triangle in a ground plane in a direction orthogonal to the third rope to align the calibration jig fix calibration of the image capturing device.

18. The system of claim 15, wherein the third rope comprises two segments of equal length joined together by a ring that allows the center rope to pass through it.

19. The system of claim 15, wherein the center rope is adjusted to pass through a center of the calibration triangle to align the calibration jig for calibration of the image capturing device.

20. The system of claim 19, wherein the center rope is adjusted by moving the first connection point in a ground plane in a direction substantially parallel to the third rope.

* * * * *